(12) United States Patent
Lutz

(10) Patent No.: US 8,565,367 B2
(45) Date of Patent: Oct. 22, 2013

(54) DETACHABLE NUCLEAR REACTOR FUEL ASSEMBLY COMPONENT

(75) Inventor: Daniel Reese Lutz, San Jose, CA (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 1054 days.

(21) Appl. No.: 12/078,904

(22) Filed: Apr. 8, 2008

(65) Prior Publication Data

US 2009/0252280 A1    Oct. 8, 2009

(51) Int. Cl.
*G21C 3/34* (2006.01)

(52) U.S. Cl.
USPC ............ 376/438; 376/409; 376/426; 376/434

(58) Field of Classification Search
USPC ....................................................... 376/409
See application file for complete search history.

(56) References Cited

U.S. PATENT DOCUMENTS

| | | | |
|---|---|---|---|
| 3,274,067 A | | 9/1966 | Greebler et al. |
| 3,274,071 A | | 9/1966 | Janusz |
| 3,975,949 A | * | 8/1976 | Johnson et al. ............... 73/592 |
| 4,273,613 A | | 6/1981 | Radkowsky |
| 5,009,837 A | | 4/1991 | Nguyen et al. |
| 5,280,508 A | * | 1/1994 | Okashima et al. ............ 376/261 |
| 5,859,888 A | * | 1/1999 | Elkins et al. ................. 376/443 |
| 2004/0042580 A1 | * | 3/2004 | Nylund ......................... 376/433 |
| 2007/0133734 A1 | | 6/2007 | Fawcett et al. |
| 2009/0122946 A1 | | 5/2009 | Fawcett et al. |

FOREIGN PATENT DOCUMENTS

| | | |
|---|---|---|
| EP | 0 425 856 | 5/1991 |
| EP | 1 667 165 | 6/2006 |
| JP | 51-101695 | 9/1976 |
| JP | 61-173190 | 8/1986 |
| JP | 62-102184 | 5/1987 |

OTHER PUBLICATIONS

European Search Report dated May 27, 2011 for Application No. 09157187.7.

* cited by examiner

*Primary Examiner* — Jack W Keith
*Assistant Examiner* — Marshall O'Connor
(74) *Attorney, Agent, or Firm* — Harness, Dickey & Pierce, P.L.C.

(57) ABSTRACT

Example embodiments are directed to fuel assembly components and nuclear fuel bundles including the fuel assembly components. Example embodiments of a fuel assembly component may include a cylindrical device having first and second ends and a mounting assembly on the first end of the cylindrical device configured to attach to and detach from a partial length fuel rod. Example embodiments of a nuclear fuel bundle may include an upper tie plate, a lower tie plate, at least one full-length fuel rod, at least one partial length fuel rod, and a fuel assembly component.

11 Claims, 4 Drawing Sheets

DETACHABLE NUCLEAR REACTOR FUEL ASSEMBLY COMPONENT

BACKGROUND

1. Field

Example embodiments generally relate to fuel assembly components attachable to fuel structures in nuclear power plants.

2. Description of Related Art

Generally, nuclear power plants include a reactor core having fuel arranged therein to produce power by nuclear fission. A common design in U.S. nuclear power plants is to arrange fuel in a plurality of fuel rods bound together as a fuel assembly, or fuel bundle, placed within the reactor core. These fuel rods typically include several elements joining the fuel rods to assembly components at various axial locations throughout the assembly.

As shown in FIG. 1, a conventional fuel bundle 10 of a nuclear reactor, such as a BWR, may include an outer channel 12 surrounding an upper tie plate 14 and a lower tie plate 16. A plurality of full-length fuel rods 18 and/or partial length fuel rods 19 may be arranged in a matrix within the fuel bundle 10 and pass through a plurality of spacers 20. Fuel rods 18 and 19 generally originate and terminate at upper and lower tie plates 14 and 16, continuously running the length of the fuel bundle 10, with the exception of partial length rods 19, which all terminate at a lower vertical position from the full length rods 18.

As shown in FIG. 2, fuel elements 25 may be shaped in pellet-form and placed within the fuel rods 18 or 19. These fuel pellets 25 may be "stacked" within the fuel rod continuously to provide fuel through the length of the fuel rod 18 or 19. The stacking of fuel pellets 25 may permit expansion or other deformation of the fuel pellets 25 during the operation cycle of the reactor core.

In conventional practice, entire fuel rods are removed from the nuclear fuel rod assemblies in order to monitor materials performance. For example, a fuel rod that has been in situ in a BWR is removed and/or retrieved from the fuel rod assembly and moved to a hotcell examination facility. At the hotcell examination facility, the fuel rod is examined to determine such parameters as oxide thickness to determine levels of corrosion and hydrogen content achieved during reactor operation. Another method referred to as "shaving" has been suggested to monitor materials performance of fuel rods. In shaving, a portion of the outer surface of a fuel rod is "shaved" or removed and the hydrogen content of the shavings is then determined. Alternatively, entire spacers and/or water rods may be retrieved and examined. However, all of these methods of monitoring materials performance require substantial effort, are costly, and may create waste that requires substantially more effort to handle and process.

SUMMARY

Example embodiments are directed to fuel assembly components and nuclear fuel bundles including the fuel assembly components. Example embodiments of a fuel assembly component may include a cylindrical device having first and second ends and a mounting assembly on the first end of the cylindrical device configured to attach to and detach from a partial length fuel rod. Example embodiments of a nuclear fuel bundle may include an upper tie plate, a lower tie plate, at least one full-length fuel rod, at least one partial length fuel rod, and the fuel assembly component.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION OF EXAMPLE EMBODIMENTS

Figure 1:
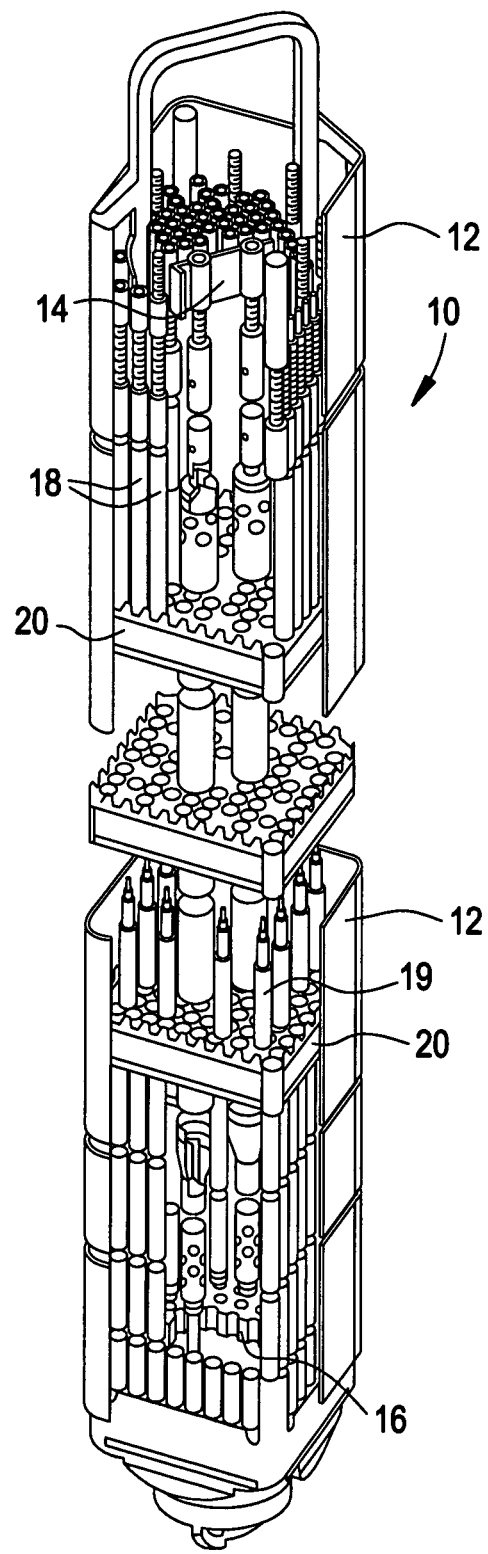
FIG. 1 is an illustration of a conventional art fuel assembly.

Various example embodiments will now be described more fully with reference to the accompanying drawings in which some example embodiments are illustrated. In the drawings, the thicknesses of layers and regions may be exaggerated for clarity.

Detailed illustrative embodiments are disclosed herein. However, specific structural and functional details disclosed herein are merely representative for purposes of describing example embodiments. This invention may, however, be embodied in many alternate forms and should not be construed as limited to only example embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise.

It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the scope of example embodiments.

Spatially relative terms, e.g. "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g. those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various aspects will be described in detail with reference to the attached drawings. However, the example embodiments are not limited to example embodiments described.

Example embodiments will now be described more fully with reference to the accompanying drawings, in which exemplary embodiments of the invention are shown. The example embodiments may, however, be embodied in many different forms and should not be construed as being limited to the embodiments set forth herein. Rather, these embodiments are provided so that this disclosure will be thorough and complete, and will fully convey the scope of the invention to one of ordinary skill in the art. In the drawings, the sizes of constitutional elements may be exaggerated for convenience of illustration.

Figure 3:
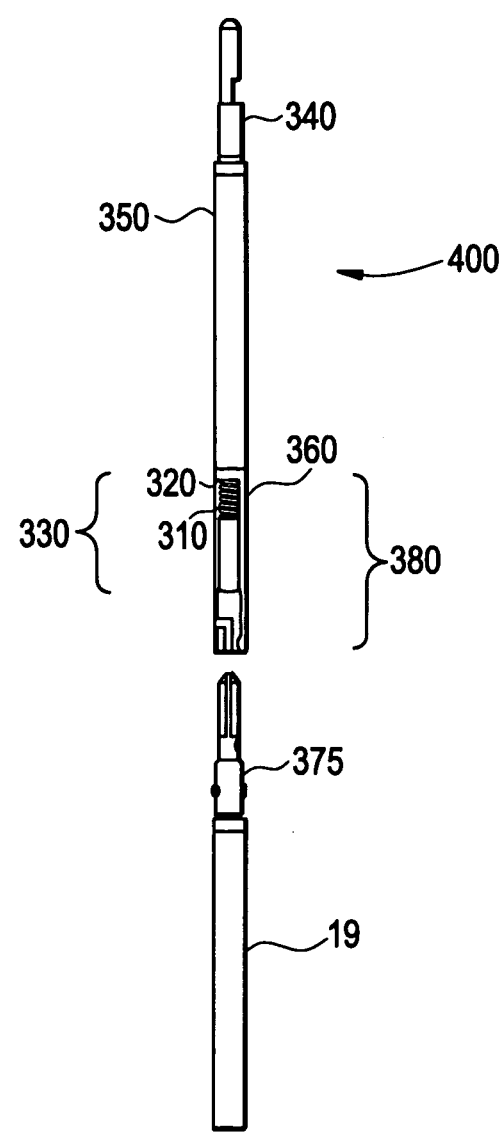
FIG. 3 is an illustration of an example embodiment fuel assembly component.

FIG. 3 illustrates an example embodiment of a fuel assembly component 400 and a partial length fuel rod 19 to which the fuel assembly component 400 attaches. The fuel assembly component 400 includes a cylindrical device 350 and a mounting assembly 380. The mounting assembly 380 attaches the fuel assembly component 400 to e.g. a partial length fuel rod 19.

The cylindrical device 350 may have any of several designs. For example, the cylindrical device 350 is generally a hollow tube having two ends and may be for example, a fuel rod tube, an unfueled section of fuel rod cladding, etc. Alternatively, the device may be a solid rod and/or bar, etc. The mounting assembly 380 attaches the fuel assembly component 400 to a partial length fuel rod 19 and/or any similarly configured device, for example, a dummy rod, an unfueled partial length fuel rod, a dummy tube, etc. in any of several ways. For example, as shown in FIG. 3, mounting assembly 380 includes a bayonet style female endplug 360 having a recess in which partial length fuel rod bayonet style male endplug 375 is inserted and turned to lock. In FIG. 3, the mounting assembly 380 may also include locking assembly 330. As shown, the locking assembly 330 includes a locking spring 310 and a locking spring recess 320, which locks the partial length fuel rod bayonet style male endplug 375 when the endplug 375 is inserted and turned in the bayonet style female endplug 360. Alternatively, for example, partial length fuel rod 19 may include an endcap that includes a screw device (not shown) that may screw into a recess including screw threads (not shown) of the mounting assembly 380. Or, for example, fuel assembly component 400 may attach to an end of partial length fuel rod 19 via other lock-and-key mechanisms. In any of these mounting assemblies, the fuel assembly component 400 is easily attached and detached when desired from the partial length fuel rod 19 for evaluation of, for example, in-service materials performance. The mounting assembly prevents the device from becoming detached inadvertently during operation of the fuel assembly. These are but a few examples of mounting assemblies that may be used and are not intended to be limiting.

In other example embodiments, the fuel assembly component may include a device to "cap" the end of the cylindrical device 350, for example, a slug, an end cap, an endplug, a partial length fuel rod endplug, etc. 340, which is attached to the other end of the cylindrical device 350 from the mounting assembly 380. The cap 350 may be configured to allow a fuel assembly component removal device (not shown) to easily remove the fuel assembly component 400 from the partial length fuel rod 19 for evaluation. The cap 350 may also, for example, form an air tight seal at the end of cylindrical device 350. If the cap 350 is used to form an air tight seal, then the fuel assembly component may be pressurized and the fuel assembly component 400 may be used to evaluate additional information, e.g. the orientation of hydride that forms during in situ operation.

The fuel assembly component 400 may have a length and width determined by the design parameters of the nuclear reactor in which it is being used. As a fuel rod 18 may be 165 inches, the fuel assembly component 400 may vary in size according to the length of the partial length fuel rod 19 to which the fuel assembly component 400 is being attached. For example, the fuel assembly component may be of a short length, e.g., 2 to 6 inches or longer, e.g., up to 24 inches. In addition, the width of the fuel assembly component 400 may vary according to the type of mounting assembly 380 used, e.g. the diameter of the fuel assembly component 400 may be the same as the partial length fuel rod 19.

The fuel assembly component 400 may be used for several purposes, e.g., to monitor in-service materials behavior, test fuel materials, test fuel rod cladding materials, ascertain neutron effects on fuel assembly materials, etc.

Figure 2:
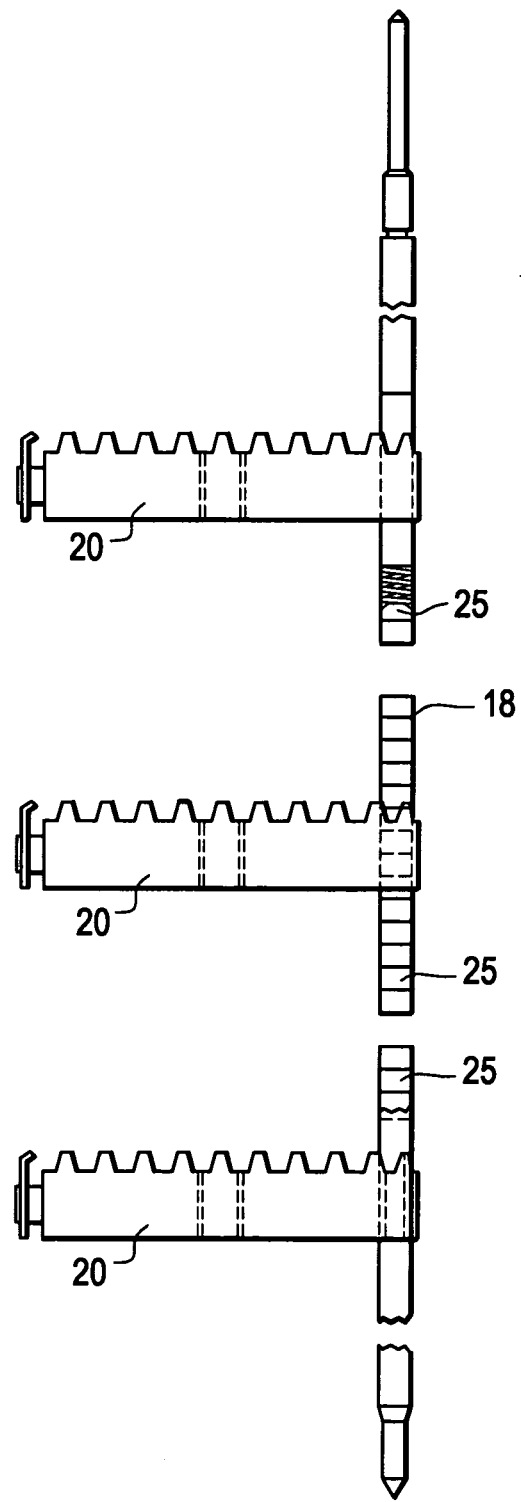
FIG. 2 is an illustration of a conventional art fuel rod having stacked fuel pellets.
Figure 4:
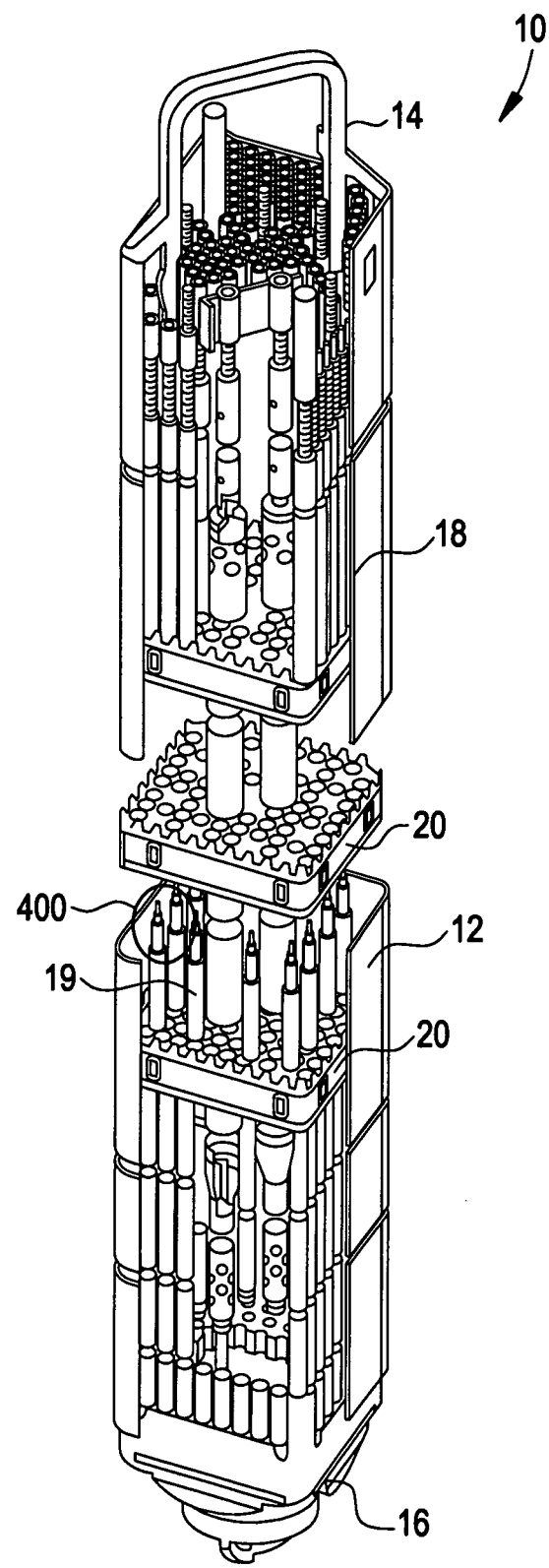
FIG. 4 is an illustration of an example embodiment fuel bundle including the fuel assembly component of FIG. 3.

As shown in FIG. 4, example embodiment fuel assembly components 400 may be mounted on conventional nuclear fuel rods 19 (FIGS. 1 & 2) in a fuel bundle 10.

A nuclear reactor including a fuel bundle with a partial length fuel rod 19 having an example embodiment fuel assembly component 400 may be operated at normal power operation such that example embodiment fuel assembly component 400 is irradiated by neutron flux present in the operating reactor. Once irradiated the fuel assembly component 400 may be removed from the nuclear reactor by detaching the fuel assembly component 400 from the partial length fuel rod 19, for example, during reactor shut down. The removed fuel assembly component 400 may then be evaluated for various in-service parameters as discussed above. Namely, instead of removing a substantially larger fuel rod, water rod, etc., the fuel assembly 400 may be much more easily removed and used for testing. The fuel assembly component 400 may be attached to partial length fuel rod 19 at any location within the fuel bundle depending on the desired materials information and length of the partial length fuel rod 19. For example, the fuel assembly component 400 may be positioned in the middle of the fuel bundle 10 as shown in FIG. 4 or at an end of fuel bundle 10 (not shown).

Although example embodiment fuel assembly components may be inserted into BWR-type fuel rods and fuel bundles in example embodiments, it is understood that other types of fuel and power plants may be useable with example embodiment retention devices. For example, PWR, CANDU, RBMK, ESBWR, etc. type reactors may include fuel rods that can accommodate example embodiment retention devices in order to irradiate irradiation targets therein.

Example embodiments thus being described, it will be appreciated by one skilled in the art that example embodiments may be varied through routine experimentation and without further inventive activity. For example, other fuel types, shapes, and configurations may be used in conjunction with example embodiment fuel bundles and tie plate attachments. Variations are not to be regarded as departure from the spirit and scope of the exemplary embodiments, and all such modifications as would be obvious to one skilled in the art are intended to be included within the scope of the following claims.

What is claimed is:

1. A nuclear fuel bundle comprising:
   an upper tie plate;
   a lower tie plate;
   at least one full-length fuel rod extending between the upper tie plate and the lower tie plate;
   at least one partial length fuel rod extending from the lower tie plate towards the upper tie plate;
   a fuel assembly component mounted on the at least one partial length fuel rod, the fuel assembly component including,
      a cylindrical device having first and second ends, the first end having a mounting assembly including a locking assembly attaching the cylindrical device to one of the at least one partial length fuel rods; and
   the nuclear fuel bundle being in a nuclear reactor,
   wherein the cylindrical device is one of a hollow tube with solid walls and a solid rod, the hollow tube not including any material in the tube.

2. The nuclear fuel bundle of claim 1, wherein the fuel assembly component is configured to collect in-service material performance data.

3. The nuclear fuel bundle of claim 1, wherein the fuel assembly component is configured to test fuel materials.

4. The fuel assembly component of claim 1, wherein the cylindrical device is a fuel rod tube.

5. The nuclear fuel bundle of claim 4, wherein the fuel rod tube is an unfueled section of fuel rod cladding.

6. The nuclear fuel bundle of claim 1, further including:
   at least one of an end cap, an endplug, and a partial length fuel rod endplug attached to the second end of the cylindrical device.

7. The nuclear fuel bundle of claim 6, wherein the fuel assembly component is pressurized.

8. The nuclear fuel bundle of claim 1, wherein the fuel assembly component has the same outer diameter as the partial length fuel rod.

9. The nuclear fuel bundle of claim 6, wherein the second end of the cylindrical device is a partial length fuel rod endplug.

10. The nuclear fuel bundle of claim 1, wherein the locking assembly includes a locking spring recess and a locking spring.

11. The nuclear fuel bundle of claim 1, wherein the mounting assembly includes a bayonet female endplug.

* * * * *